United States Patent [19]
Nilsson

[11] Patent Number: 4,628,633
[45] Date of Patent: Dec. 16, 1986

[54] GERMINATION IMPROVING SEED CAPSULE AND METHOD OF PREPARING THE SAME

[76] Inventor: Lars G. Nilsson, Pl 1786, S-782 00 Malung, Sweden

[21] Appl. No.: 705,428
[22] PCT Filed: May 26, 1983
[86] PCT No.: PCT/SE83/00211
 § 371 Date: Jan. 22, 1985
 § 102(e) Date: Jan. 22, 1985
[87] PCT Pub. No.: WO84/04651
 PCT Pub. Date: Dec. 6, 1984

[51] Int. Cl.⁴ ............................................. A01C 1/06
[52] U.S. Cl. ..................................... 47/57.6; 249/122
[58] Field of Search ............... 47/1.5, 56, 57.6, 73, 47/74; 264/279.1, 251, 250, 297.8, 319, 332, 122, 123, 109; 249/122, 154; 425/394, 398, 406, 442, 472

[56] References Cited

U.S. PATENT DOCUMENTS

| | | | |
|---|---|---|---|
| 3,112,577 | 12/1963 | Bürger | 47/56 X |
| 3,467,609 | 9/1969 | Adams et al. | 47/77 |
| 3,555,730 | 1/1971 | Brink | 47/57.6 |
| 3,561,159 | 2/1971 | Adams | 47/57.6 |
| 3,600,830 | 8/1971 | Bjarred | 47/57.6 |
| 3,616,573 | 11/1971 | Clifford | 47/57.6 |
| 3,659,396 | 5/1972 | Baker | 47/56 X |
| 3,688,437 | 9/1972 | Hamrin | 47/57.6 |
| 3,690,034 | 9/1972 | Knapp | 47/57.6 |

FOREIGN PATENT DOCUMENTS

| | | |
|---|---|---|
| 744038 | 1/1944 | Fed. Rep. of Germany ......... 47/74 |
| 2036169 | 1/1972 | Fed. Rep. of Germany . |
| 346676 | 7/1972 | Sweden . |
| 79091542 | 5/1979 | Sweden . |
| 725593 | 4/1980 | U.S.S.R. .............................. 47/57.6 |

*Primary Examiner*—James R. Feyrer
*Attorney, Agent, or Firm*—Bacon & Thomas

[57] ABSTRACT

The invention relates to plant seeds enclosed by a germination improving capsule (1, 2) having a water absorbing ability, which capsule by water absorption may form a loose, partially light transmitting structure enclosing the seed (5), which structure may easily be penetrated by the germinating seed. A suitable capsule material is compressed peat. The invention also relates to a method of preparing such seed capsules.

9 Claims, 11 Drawing Figures

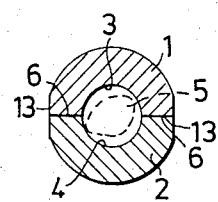
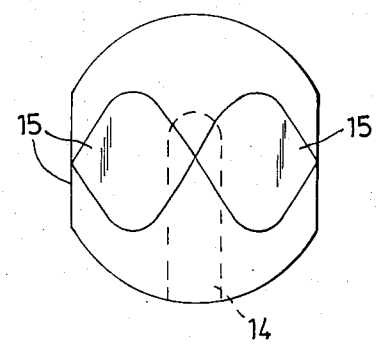
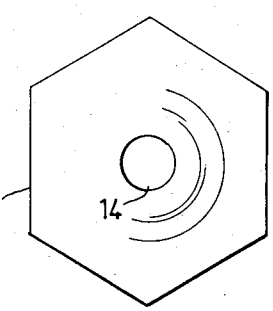
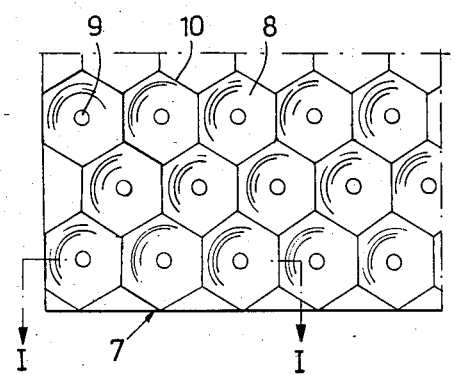
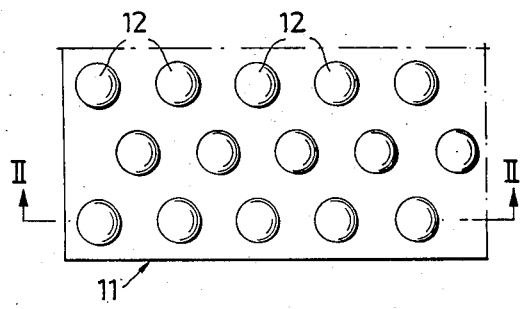
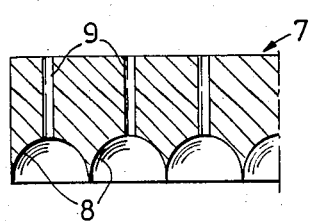
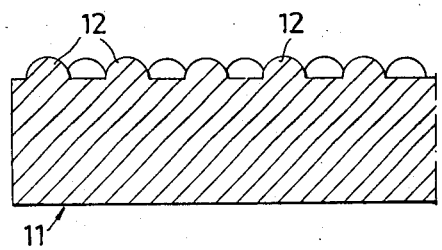

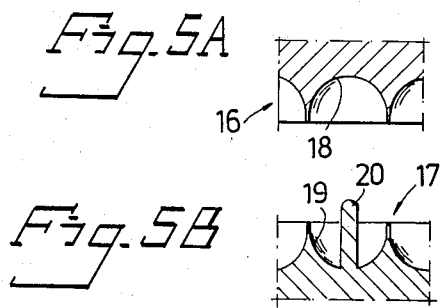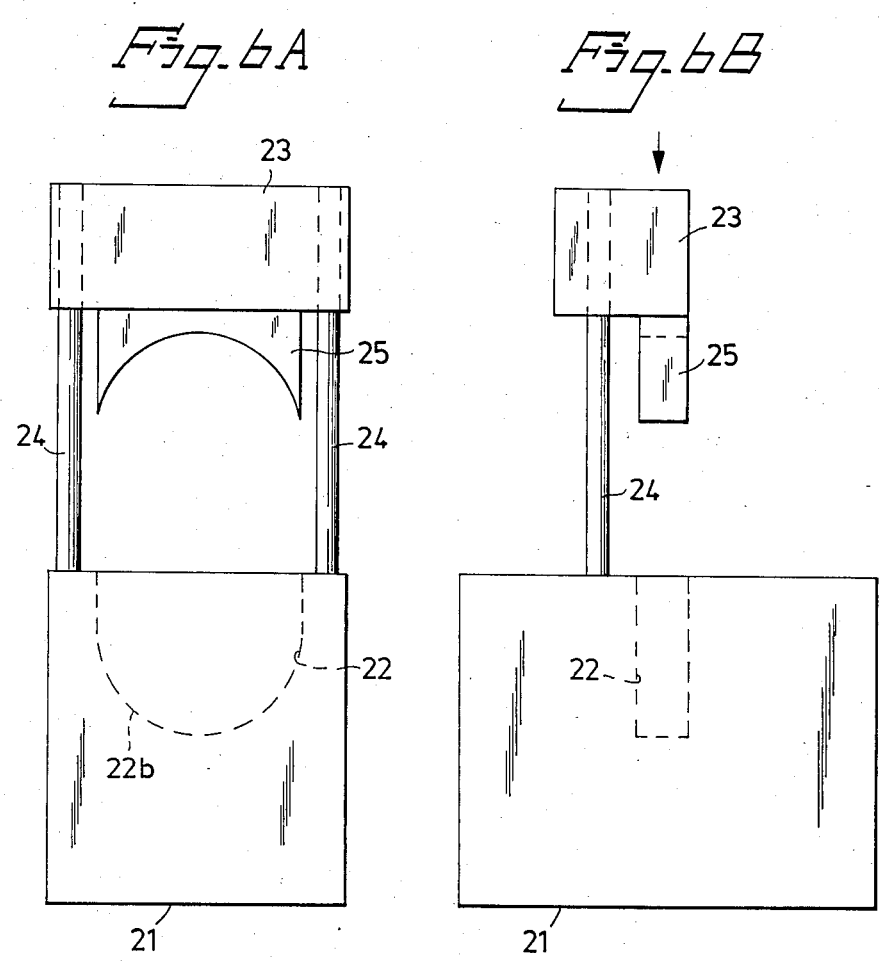

GERMINATION IMPROVING SEED CAPSULE AND METHOD OF PREPARING THE SAME

The present invention relates to improving the germinativeness of plant seeds, particularly conifer seeds, by incapsulation, and more particularly to such a seed capsule as well as a method of preparing the same.

New forest stands are established by planting or seeding. Planting is an expensive procedure, although recently more rational raising and planting methods have been made use of with an increasing degree of mechanization. Seeding is cheaper but in return considerably more uncertain, and a relatively great number of seeds must be spread for the desired number of seeds to germinate and develop into plants. Inter alia due to the relatively high seed cost and the uncertainty of seeding, planting is at present the predominating method of forest-culture, and particularly the mechanization-suited "paper-pot" method, wherein plants are grown in pots of board or compressed peat having porous walls, through which the roots of the plants may grow out into the surrounding soil after the planting thereof in forest land. This method, however, often gives an entangled root system making the trees more susceptible to blowing down. There is much speaking for the fact that the simpler seeding procedure would get a much more extensive use if the germinativeness of the seeds could be increased and the seed cost thereby be reduced. In order to improve the germination conditions for the seeds and thereby reduce the necessary number of seeds to be sown, a method has been used to a certain extent wherein a smaller number of seeds, e.g. 3-4 seeds, are covered with a funnel or cone of a degradable plastic material which for a period of time will provide a greenhouse effect.

The object of the invention is to provide an improved germinativeness of seeds intended for direct seeding, such that the necessary number of seeds and thereby the costs for the seeding can be reduced to a considerable extent. According to the invention this is accomplished by providing each seed separately or possibly in groups of several seeds, e.g. 2 or 3 seeds, with a cover or capsule of a dry, hydrophilic material, which in itself is, or on water absorption, e.g., through capillary effects, swells and forms a loose, at least somewhat light transmitting structure, which can easily be penetrated by the growing germ. After seeding such a seed cover ensures favourable germination conditions for the seed (or seeds), providing the necessary germination components water, oxygen and light. The capsule or cover also gives a certain heat-insulating effect. With such a cover the germinativeness of i.a. spruce seed has proved to increase considerably, as will be described in more detail hereinafter.

Various cover materials may be used which meet the above criterions and which do not give off substances which are toxic to the seeds. As examples may be mentioned materials based upon peat, mineral wool, paper pulp, various synthetic materials, such as plastic, e.g. plastic foam, etc., alone or in combination. Particularly advantageous are, however, cover materials based upon compressed peat, optionally together with other ingredients, such as, for example, paper fibres. The cover may also be based upon particles or cover parts of a harder, water-insoluble material kept together by a water-soluble material.

The shape of the cover may vary. Thus, ball-shaped, oval, cubic, etc. covers or capsules may be used, but with regard to the handling thereof a substantially ball-shaped or pellet-like cover is preferred. Depending on the cover material—and the size thereof—it may in order to improve its keeping together and prevent it from littering be provided with a shell e.g., in the form of filter paper or the like, a net pressed into the surface, or by spraying with a suitable solution of binding agent, such as sugar syrup, wood fibre solution etc.

The introduction of the seed or seeds into the cover may be effected in various ways. For example, the cover may be made into halves or parts, at least one part or half of which comprises a suitable recess for the seed or seeds. After introducing the seed into the recess the capsule parts are secured to each other, e.g. by glueing with a preferably water-soluble adhesive. Alternatively, a cover body may be provided with a suitably diametrical passage which extends into the body and into which the seed is inserted, and the passage is then sealed in any suitable manner, e.g. by a plug of the cover material. Such seed containing capsules may conveniently be made completely by machinery utilizing per se conventional technique.

The cavity of the cover or capsule for the seed (or seeds) may have any desired shape, e.g. ellipsoid, globular, parallelepipedic, etc. Preferably the cavity has such a form that the seed well fits into it. When using more than one seed, e.g. two, they may be placed in the same cavity, or alternatively in separate cavities in the capsule.

The desired swelling properties of the cover may be obtained by substantially compressing the cover material, which, e.g., may be fibrous, granular or powdery, prior to and/or in connection with the forming thereof into the desired cover or capsule configuration. Preferably the material is compressed in several directions for the completed cover to swell at least fairly uniformly in various directions when absorbing water. This may, for example, be accomplished by first compressing the cover material in at least one direction and subsequently compressing it in at least one other direction which suitably may be substantially perpendicular to said first mentioned compression direction or directions. Thus, the cover material may, e.g., first be compressed into a disc, loaf or the like, which is then optionally divided into pieces and compressed to form the individual capsules or capsule parts. By suitably selecting the compression pressure and directions the cover body may be given such volume swelling properties that it will obtain an appropriate swelling on water absorption. As mentioned above the seed capsule should swell relatively uniformly to reduce to the utmost possible extent the risk of the plant seed being exposed during the swelling of the cover.

As mentioned above compressed peat is a particularly preferred cover material which in addition to having suitable physical properties also may deliver some nutrition to the seed. In a moist environment the compressed peat absorbs water and swells to its natural consistency (as bog peat). According to the invention the cover material based upon peat should be compressed to such an exent that a volume swelling of, for example, about 10 to about 30 times is obtained, suitably 15 to 20 times, corresponding to a linear swelling of about 2.5 times. The size of the cover, of course, depends on the kind of seed used and may thus vary from, for example, a few centimeters to a few millimeters. A suitable outer diameter for ball-shaped covers or capsules for Swedish spruce and pine seeds are, for example, about 5–12 mm, preferably 6–10 mm. The thickness of the cover walls should be sufficiently great to provide the desired protection and the moist or humid environment around the seed, but sufficiently small to transmit light to the necessary extent (after the water absorption). Suitably, the cover should have such a thickness that the thickness of the peat after the swelling thereof approximately corresponds to the normal seeding depth. A suitable wall thickness for such a pine or spruce seed peat capsule may thus be, for example, about 1–3 mm, e.g. 1.5 mm. A peat-based seed ball or pellet is kept together by the natural binding agents of the peat, and in a moist environment it will swell and eventually collapse into a small porous and light transmitting heap over the seed giving a very small resistance to the penetrating roots.

When necessary the cover or capsule material may be provided with additives in the form of nutrients, e.g. nutritive salts, wetting agents to increase the water absorption, fungus cultures for keeping harmful insects away, germination inhibitors for germination not to be initiated to early, etc. The cover may also be coloured in a suitable colour, e.g. blue, in order not to be attractive to noxious animals.

A seed capsule according to the invention may be sown in the same way as naked seeds, except that it will not be necessary to use as many seeds. Preferably a conventional preparation of the ground is performed before the seeding, but the seed capsules may also, advantageously, be put directly on the ground, and also (due to the protective cover) on the snow in spring. The seed capsule of the invention also permits other spreading methods, such as seeding from the air, e.g. by means of a helicopter. Optionally, the seed capsules may be watered in connection with the seeding thereof. In such a case the cover may suitably comprise an additional outer layer of a material which quickly absorbs and retains the water.

While the invention primarily is intended to be applied to conifer seeds, and particularly spruce and pine seeds, it may, of course, also be used for improving the germinativeness of most other seeds, e.g. seeds for kitchen gardens and the like.

The invention also relates to the preparation of the above described seed capsules by compressing the capsule material into capsules or capsule parts having the desired form and an accessible recess for the seed, introducing at least one seed into the seed recess and completing the seed capsules by jointing two capsule parts or sealing a channel-shaped seed recess in a complete capsule.

Hereinafter the invention will be described in more detail with regard to some special embodiments thereof, to which it, however, is not restricted in any way. Reference is made to the accompanying drawings, wherein FIG. 1 is a schematic sectional view of an embodiment of a seed capsule in accordance with the invention, FIG. 2a is a schematic side view of another embodiment of a seed capsule in accordance with the invention (without any seed), FIG. 2b is a side view from below of the seed capsule of FIG. 2a, FIG. 3a is a schematic view from above of a press plate for the preparation of the seed capsules of FIG. 1, FIG. 3b is a sectional view along the line I—I in FIG. 3a, FIG. 4a is a view from above of a press plate complementary to the press plate of FIG. 3a, FIG. 4b is a sectional view along the line II—II in FIG. 4a, FIG. 5a and 5b are partial sectional views of complementary press parts for the preparation of the seed capsules of FIG. 2a and 2b, FIG. 6a is a schematic front view of a device for pre-pressing the seed capsule material, and FIG. 6b is a schematic side view of the device of FIG. 6a.

The seed ball or pellet of FIG. 1 comprises two substantially uniform pellet halves 1 and 2, each having an internal recess or depression 3 and 4, respectively, which recesses together form a seed cavity. A seed 5 is indicated with broken lines. The two capsule halves 1 and 2 are jointed to each other by means of a complete or point-wise glue line 6. For Swedish spruce and pine seeds a suitable external diameter of the ball or pellet may be 6–8 mm with a wall thickness of about 1.5 mm.

A seed ball in accordance with FIG. 1 may be prepared from peat (which optionally may be mixed with various additives, such as nutritive salts, paper fibres, etc.) by means of the press plates shown in FIGS. 3 and 4. One press plate, generally designated with the reference numeral 7 in FIG. 3a, comprises a plate which on one side thereof has a number of closely arranged, substantially hemispherical recesses 8. From the bottom of the recesses 8 vertical airing passages 9 (which optionally may be omitted) lead to the opposite side of the plate. To permit maximum close-packing of the capsule moulds 8 in the plate 7 the top part of the recesses is hexagonal. Hereby the thickness of the walls 10 between the recesses, and thereby the peat material between the recesses 8, may be minimized. The plate complementary to the plate 7, and generally designated with 11 in FIG. 4, has on one side thereof a number of, in the illustrated case substantially hemispherical, protrusions 12 corresponding to the recesses 8 of the plate 7. The configuration of the recesses 8 corresponds to the external shape of each seed ball half 1, 2 in FIG. 1, while the configuration of the protrusions 12 on the plate 11 corresponds to the configuration of the limiting surface of the cavity halves 3, 4. The above mentioned hexagonal portion of the moulds 8 has its correspondence in a flat portion 13 of the respective capsule half, which flat portions together form six flat side portions on the seed capsule. These portions should be as small as possible for the capsule to obtain the ideal ball-shaped pellet form. As mentioned above the protrusions 12 may, of course, be formed to give any other desired shape to the seed cavity.

To mould the capsule halves an optionally pre-pressed sheet of shortfibred pulverized peat of a suitable fibre length (up to some millimeters), is placed between the plate 7 and the plate 11. The plates are then pressed towards each other with the necessary pressure for the capsule halves 1, 2 to be formed between the two press plates 7, 11. On removal of the plate 11 a continuous sheet of individual capsule halves 1, 2 is obtained, the capsule halves being kept together by a thin peat portion corresponding to the dimension of the wall portions 10 of the mould plate 7. A seed 5 is then introduced into each recess 3, 4 in the capsule halves of a sheet, a suitable water-soluble adhesive is applied to the horizontal wall parts of the capsule halves, and another corresponding sheet of capsule halves is applied against the first mentioned sheet with the capsule halves 1, 2 aligned with each other and is glued in this position. By means of a suitable punching device the excess peat material or "burr" between the capsule halves and which keeps them together is then cut off, and the seed capsules or pellets are ready for use. When pressing the capsule halves i.a. natural resins are pressed out therefrom, whereby the peat fibres are efficiently bound together. By applying a sufficient pressure in the moulding operation it is possible to obtain seed balls having a relatively hard surface which does not litter. To further ensure that peat powder does not get loose from the seed balls in the handling thereof, they may be provided with a shell in the form of thin paper, e.g., of filter paper type, or a pressed-in net, or they may be sprayed with a solution (however, containing very little water) of a substance providing a suitable continuous coating and which, of course, does not contain any substance that is harmful to the seed. As an example a syrup of sugar or a wood fibre slurry may be mentioned. The compression pressure must, of course, not be so high that the water absorbing capacity of the completed seed capsule will be too low or eliminated. Further, the pressure should be maintained for some time to permit "sintering" of the fibres.

The above described preparation process is quite schematic and is, of course, meant to be performed substantially continuously in a mechanical process of manufacture. Instead of the press plates 7 and 11 corresponding pressing tools in the form of rolls may then conveniently be used.

In order that the peat of the seed capsules should swell approximately to the same extent in all directions the peat is preferably compressed in several directions during the manufacturing procedure, e.g., such that the peat powder is first compressed in one direction into a slab or plate, which is subsequently cut cross-wise into discs, which in turn, for preparing the seed capsules, are compressed in a direction perpendicular to said first press direction. The completed peat balls should, due to their high moisture-absorbing capacity, be stored in the absence of moisture and in other respects as is conventional for seeds, i.e. darkly and coolly.

FIG. 6a, 6b schematically show an example of a press device for pre-pressing the peat material. This device comprises a stationary lower part 21 having a disc-shaped mould cavity 22, the bottom 22b of which has a circular curvature. A movable press porton 23, which in the illustrated case is displaceably mounted along two guide rods 24, supports in its lower part an upper disc-shaped portion 25 which tightly fits into the recess 22. The lower edge of the upper mould portion 25 has a concave configuration, also with a circular curvature. When the mould portion 25 is sufficiently inserted into the recess 22 they form together a substantially circular cavity. The operation of the press may, for example, be effected by hydraulic means.

For the pressing peat powder or the like is introduced into the mould cavity 22 and the movable press head 23 is displaced (in the direction of the arrow), such that the upper mould portion 25 is inserted into the cavity 22 thereby compressing the peat. Due to the substantially circular configuration of the cavity in which the peat is enclosed, the pressure applied to the peat mass will be distributed substantially radially along the periphery of the peat disc formed. After a volume compression of, for example, about 3 times by means of the press device a puck-like disc is obtained, the material of which keeps together relatively well, which disc is then compressed in the axial direction thereof, e.g., in the manner described in connection with FIGS. 3 and 4 above, or alternatively as described in connection with 5a, 5b.

By suitably selecting the compression pressures, e.g., about 20–30 N/mm$^2$ with the device of FIG. 6a, 6b and about 50–60 N/mm$^2$ with the device of FIG. 5a, 5b, a substantially uniform volume swelling of the seed capsule obtained may be achieved on water absorption. After its swelling a suitably compressed seed capsule in accordance with the invention will have an approximately cube-like shape.

FIGS. 2a and 2b show (in magnification) an alternative embodiment of the seed capsule in accordance with the invention. In contrast to the capsule of FIG. 1, which consists of two halves, the capsule of this embodiment is made in one piece. To form a cavity for the seed a passage 14 (shown with broken lines) extends diametrically into the capsule or ball from the outside thereof and somewhat beyond its centre. For the sake of illustrative clarity no seed is shown. The passage 14, which is adapted to permit the seed to be conveniently introduced into it, is sealed with a peat plug after the insertion of the seed, which peat plug is not illustrated. For manufacturing-technical reasons also this embodiment will, in the same way as the seed ball of FIG. 1, obtain six flat portions 15 extending around the periphery of the ball. To make the variant of FIGS. 2a and 2b press tools may be used which comprise the portions shown in FIG. 5a and 5b. In the same way as above a peat plate, which has previously been compressed about 50% perpendicularly to the now actual compression direction and has been cut into about a centimeter thick slices, or has been compressed in the press device described above in connection with FIGS. 6a, 6b, is placed between two plates or rolls comprising the two complementary portions 16 (FIG. 5a) and 17 (FIG. 5b). The press portion 16 comprises a plurality of adjacent substantially hemispherical recesses 18, while the opposed press portion 17 comprises corresponding substantially hemispherical recesses 19, which, however, in the centre thereof have a peg or pin 20, which suitably has a circular cross section and which projects above the edge of the press plate. The cavities 18, 19 in each press plate or roll 16, 17 are, for the above described reasons of convenience, preferably arranged with hexagonal upper parts closely packed according to FIG. 3a. When pressing the press portions 16, 17 together seed balls in accordance with FIGS. 2a, 2b are obtained, the two cavities 18, 19 together corresponding to the external configuration of the seed ball, while the peg or pin 20 corresponds to the seed package 14. In the same way as in the moulding of the embodiment of FIG. 1 a continuous sheet of seed balls is obtained. A seed is then put into each seed passage 14, e.g., by means of compressed air blowing via a plastic tube or the like, and the passage 14 is then sealed by pressing a plug of peat or any other suitable material into the same in any suitable manner. After cutting off the burr portions, which keep the seed balls together in the sheet, with a suitable punching tool the balls are ready for use. As above they may optionally be provided with a protective shell or coating.

Seed balls or pellets containing spruce seeds have in practical tests proved to give a favourable increase of the germinativeness. A comparative test performed with peat capsules in accordance with FIG. 1 is summarized below.

TEST

A number of peat capsules in accordance with FIG. 1, prepared as described above and having a diameter of 5–6 mm and a wall thickness of about 1.5 mm, and each containing a spruce seed, were tested with regard to their germination level and compared with conventional naked spruce seeds from the same seed lot (plantation seed). A good spot of prepared ground having favourable germination conditions was simulated in the following way.

An aluminum foil bowl filled with peat and in which the top layer was mixed with sand was placed in an outer bowl having half a centimeter to one centimeter of water in the bottom thereof. Through holes in the aluminium foil bowl the germination substrate was continuously kept moist. On the moist surface two rows of 13 and 12, respectively, peat pellets in accordance with the invention, and two rows of 15 seeds each were arranged. The whole device was covered with a transparent plastic plate with good through-airing from the sides and placed in a greenhouse. No watering from above was performed during the whole test period. After 14 days the germination result was studied, and it was noted whether the seed had germinated. The results are shown in Table 1 below.

TABLE 1

| Sown | Peat pellets 13 | Peat pellets 12 | Naked seeds 15 | Naked Seeds 15 |
|---|---|---|---|---|
| not germinated | 0 | 3 | 11 | 13 |
| germinated | 13 | 9 | 4 | 2 |

The water absorption of the pelleted seeds was quick (3–5 minutes), and they swelled and collapsed into small heaps having a very loose structure.

From the test it appears that the pelleted seeds in accordance with the invention have a clearly improved germinativeness in comparison with the naked seeds under the germination conditions indicated for the test.

The invention is, of course, not restricted to the above particularly described and shown embodiments, but many variations and modifications are possible within the scope of the general inventive concept, such as it is indicated in the subsequent claims. Thus, e.g., the methods for both the pre-pressing and the final pressing of the cover material may be varied considerably.

I claim:

1. A method of preparing a seed capsule which when subjected to ambient moisture conditions will swell to form a loose, partially light transmitting structure enclosing the seed but easily penetrated by the germinating seed, comprising the steps of:
    pre-compressing a material to form a plate thereof, the pressure substantially being exerted in at least one first direction generally parallel to the plate plane;
    compressing the plate obtained in a second direction substantially normal to the plate plane into a sheet comprised of a layer of a plurality of generally spherical capsule bodies, each capsule having a central hexagonal peripheral portion, the hexagonal peripheral portions of adjacent capsule bodies being connected by thin material portions such that the capsule bodies are substantially hexagonally close-packed in said sheet thereof;
    in said compressing step forming a radial recess in each capsule body extending substantially from the center thereof;
    inserting a seed into each radial recess;
    sealing each recess by a plug member;
    separating the individual seed capsules from each other.

2. The method of claim 1 which additionally comprises the step of applying a protective coating on each seed capsule.

3. A method according to claim 1, wherein said pre-compression step is performed to obtain said material plate in the form of a substantially round disc, the compression pressure being applied substantially radially thereto.

4. A method according to claim 1, wherein said material is dry, short-fibre pulverized peat.

5. A seed capsule comprising a substantially spherical body formed in one piece by compression of a material selected from the group consisting essentially of mineral wool, paper pulp, peat, plastic and combinations thereof; and having a radial recess extending substantially from the center thereof, a plug member sealing the peripheral end of said recess, said recess and said sealing member defining a seed room, and a seed located in said seed room, said substantially spherical body comprising a peripheral portion of hexagonal configuration substantially coaxial to said radial recess.

6. A seed capsule according to claim 5, wherein said material includes peat.

7. A seed capsule according to claim 6, wherein said material body has a volume swelling capacity in water absorption of about 10–30 times, by volume.

8. A seed capsule according to claim 6, wherein said seed is a conifer seed.

9. A seed capsule according to claim 6, wherein said plug member is made of said material.

* * * * *